United States Patent
Zhu et al.

(10) Patent No.: US 11,822,798 B2
(45) Date of Patent: Nov. 21, 2023

(54) DATA STORING ALLOCATION METHOD, MEMORY STORAGE APPARATUS AND MEMORY CONTROL CIRCUIT UNIT

(71) Applicant: Hefei Core Storage Electronic Limited, Anhui (CN)

(72) Inventors: Qi-Ao Zhu, Anhui (CN); Jing Zhang, Anhui (CN); Kuai Cao, Anhui (CN); Xin Wang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 134 days.

(21) Appl. No.: 17/555,487

(22) Filed: Dec. 19, 2021

(65) Prior Publication Data

US 2023/0161489 A1     May 25, 2023

(30) Foreign Application Priority Data

Nov. 23, 2021    (CN) .......................... 202111395837.7

(51) Int. Cl.
*G06F 12/00*     (2006.01)
*G06F 3/06*     (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0604; G06F 3/0631; G06F 3/0659; G06F 3/0679; G06F 3/061; G06F 3/0611
See application file for complete search history.

(56) References Cited

U.S. PATENT DOCUMENTS

| | | | | |
|---|---|---|---|---|
| 2004/0255026 | A1* | 12/2004 | Blount | G06F 3/0689 |
| | | | | 711/E12.019 |
| 2008/0052451 | A1* | 2/2008 | Pua | G06F 13/385 |
| | | | | 711/E12.008 |
| 2010/0180068 | A1* | 7/2010 | Matsumoto | G06F 12/0246 |
| | | | | 711/E12.001 |
| 2013/0013852 | A1* | 1/2013 | Hou | G06F 12/0246 |
| | | | | 711/E12.008 |
| 2015/0235709 | A1 | 8/2015 | Ohshima | |
| 2018/0081594 | A1* | 3/2018 | Jung | G11C 16/3495 |
| 2021/0223992 | A1* | 7/2021 | Hou | G11C 11/5628 |
| 2022/0035736 | A1* | 2/2022 | Chiang | G06F 3/0679 |

FOREIGN PATENT DOCUMENTS

| | | |
|---|---|---|
| TW | 200910356 | 3/2009 |
| TW | I479491 | 4/2015 |
| TW | 201814528 | 4/2018 |
| TW | I649653 | 2/2019 |
| TW | I738442 | 9/2021 |

* cited by examiner

*Primary Examiner* — John A Lane
(74) *Attorney, Agent, or Firm* — JCIPRNET

(57) ABSTRACT

A data storing allocation method, a memory storage apparatus, and a memory control circuit unit are provided. The method includes the following. A plurality of data writing speeds of a plurality of memory units are detected. An initial write volume of each memory unit is determined according to a number of dies in each memory unit. At least one compensation data volume is calculated according to the data writing speeds and the initial write volume of each memory unit. A write data corresponding to a write command is written to the memory units according to the initial write volume of each memory unit and the at least one compensation data volume.

24 Claims, 7 Drawing Sheets

DATA STORING ALLOCATION METHOD, MEMORY STORAGE APPARATUS AND MEMORY CONTROL CIRCUIT UNIT

CROSS-REFERENCE TO RELATED APPLICATION

This application claims the priority benefit of China application no. 202111395837.7, filed on Nov. 23, 2021. The entirety of the above-mentioned patent application is hereby incorporated by reference herein and made a part of this specification.

BACKGROUND

Technical Field

The disclosure relates to a memory data storing technology. Particularly, the disclosure relates to a data storing allocation method, a memory storage apparatus, and a memory control circuit unit.

Description of Related Art

Rapid growth of digital cameras, mobile phones, and MP3 players over the past few years leads to a rapid increase in consumer demands for storage media. Due to properties of non-volatile data, power saving, small size, and non-mechanical structure, a rewritable non-volatile memory module (e.g., flash memory) is suitable for being built into the above-mentioned various examples of portable multimedia devices.

With development of technology, the rewritable non-volatile memory module has gradually developed from a single level cell (SLC) NAND-type flash memory module (i.e., a flash memory module that can store 1 bit in one memory cell) into a flash memory module that includes memory cells that can store more bits, for example, a multi level cell (MLC) NAND-type flash memory module (i.e., a flash memory module that can store 2 bits in one memory cell), a triple level cell (TLC) NAND-type flash memory module (i.e., a flash memory module that can store 3 bits in one memory cell), a quad level cell (QLC) NAND-type flash memory module (i.e., a flash memory module that can store 4 bits in one memory cell), and the like. A capacity of a single die of the quad level cell NAND-type flash memory module can reach 1.33 TB. However, a memory capacity of flash memory on the market is basically calculated by a power of two, such as 256 GB, 512 GB, 1 TB, and the like. It is inevitable for the QLC NAND-type flash memory module to be mounted with an odd number of memory dies to meet the basic memory capacity. Limited by the properties of such flash memory modules, data write efficiency of a memory storage apparatus may be reduced.

SUMMARY

The disclosure provides a data storing allocation method, a memory storage apparatus, and a memory control circuit unit, where data write efficiency of the memory storage apparatus can be improved.

A data storing allocation method of the disclosure is adapted for a memory storage apparatus. The memory storage apparatus has a memory control circuit unit and a rewritable non-volatile memory module. The rewritable non-volatile memory module includes a plurality of memory units. The data storing allocation method includes the following. A write command is received from a host system. A plurality of data writing speeds of the memory units are detected. Each of the memory units has a number of dies of memory dies, and is coupled to the memory control circuit unit through one of a plurality of data input/output buses. An initial write volume of each of the memory units is determined according to the number of dies of each of the memory units. At least one compensation data volume is calculated according to the data writing speeds and the initial write volume of each of the memory units. A write data corresponding to the write command is written into the memory units according to the initial write volume of each of the memory units and the at least one compensation data volume.

In an embodiment of the disclosure, determining the initial write volume of each of the memory units according to the number of dies of each of the memory units includes the following. A write ratio between the memory units is determined according to the number of dies of each of the memory units. The initial write volume of each of the memory units is calculated according to the write ratio and a unit of write.

In an embodiment of the disclosure, values obtained from dividing a sum of the initial write volume of each of the memory units and the compensation data volume corresponding to each of the memory units by the data writing speed of each of the memory units are the same.

In an embodiment of the disclosure, writing the write data corresponding to the write command into the memory units according to the initial write volume of each of the memory units and the at least one compensation data volume includes the following. A first data corresponding to a sum of a first initial write volume of a first memory unit in the memory units and a first compensation data volume in the write data is transferred to the first memory unit through a first data input/output bus coupled to the first memory unit.

In an embodiment of the disclosure, the method further includes the following. A first data writing speed of a first memory unit and a second data writing speed of a second memory unit in the memory units are detected. A first number of dies of the memory dies in the first memory unit is greater than a second number of dies of the memory dies in the second memory unit. A first initial write volume of the first memory unit is determined according to the first number of dies, and a second initial write volume of the second memory unit is determined according to the second number of dies. The at least one compensation data volume is calculated according to the first data writing speed, the second data writing speed, the first initial write volume, and the second initial write volume. The write data is transferred to the first memory unit according to the first initial write volume and the at least one compensation data volume.

In an embodiment of the disclosure, the method further includes the following. After the write data is transferred to the first memory unit according to the first initial write volume and the at least one compensation data volume, the write data is transferred to the second memory unit according to the second initial write volume.

In an embodiment of the disclosure, the rewritable non-volatile memory module is a quad level cell (QLC) NAND-type flash memory module. The number of dies of at least one of the memory units is different from the number of dies of other ones of the memory units.

In an embodiment of the disclosure, the method further includes the following. A category of data to be written into each of the memory units or a priority for performing a garbage collection operation on each of the memory units is determined according to the number of dies of each of the memory units.

A memory storage apparatus of the disclosure includes a connection interface unit, a rewritable non-volatile memory module, and a memory control circuit unit. The connection interface unit is configured to be coupled to a host system. The rewritable non-volatile memory module includes a plurality of memory units. The memory control circuit unit is coupled to the connection interface unit and the rewritable non-volatile memory module. The memory control circuit unit is configured to receive a write command from the host system. The memory control circuit unit is further configured to detect a plurality of data writing speeds of the memory units. Each of the memory units has a number of dies of memory dies, and is coupled to the memory control circuit unit through one of a plurality of data input/output buses. The memory control circuit unit is further configured to determine an initial write volume of each of the memory units according to the number of dies of each of the memory units. The memory control circuit unit is further configured to calculate at least one compensation data volume according to the data writing speeds and the initial write volume of each of the memory units. Moreover, the memory control circuit unit is further configured to write a write data corresponding to the write command into the memory units according to the initial write volume of each of the memory units and the at least one compensation data volume.

In an embodiment of the disclosure, the memory control circuit unit is further configured to determine a write ratio between the memory units according to the number of dies of each of the memory units. Moreover, the memory control circuit unit is further configured to calculate the initial write volume of each of the memory units according to the write ratio and a unit of write.

In an embodiment of the disclosure, values obtained from dividing a sum of the initial write volume of each of the memory units and the compensation data volume corresponding to each of the memory units by the data writing speed of each of the memory units are the same.

In an embodiment of the disclosure, the memory control circuit unit is further configured to transfer a first data corresponding to a sum of a first initial write volume of a first memory unit in the memory units and a first compensation data volume in the write data to the first memory unit through a first data input/output bus coupled to the first memory unit.

In an embodiment of the disclosure, the memory control circuit unit is further configured to detect a first data writing speed of a first memory unit and a second data writing speed of a second memory unit in the memory units. A first number of dies of the memory dies in the first memory unit is greater than a second number of dies of the memory dies in the second memory unit. The memory control circuit unit is further configured to determine a first initial write volume of the first memory unit according to the first number of dies, and to determine a second initial write volume of the second memory unit according to the second number of dies. The memory control circuit unit is further configured to calculate the at least one compensation data volume according to the first data writing speed, the second data writing speed, the first initial write volume, and the second initial write volume. Moreover, the memory control circuit unit is further configured to transfer the write data to the first memory unit according to the first initial write volume and the at least one compensation data volume.

In an embodiment of the disclosure, after transferring the write data to the first memory unit according to the first initial write volume and the at least one compensation data volume, the memory control circuit unit is further configured to transfer the write data to the second memory unit according to the second initial write volume.

In an embodiment of the disclosure, the rewritable non-volatile memory module is a quad level cell (QLC) NAND-type flash memory module. The number of dies of at least one of the memory units is different from the number of dies of other ones of the memory units.

In an embodiment of the disclosure, the memory control circuit unit is further configured to determine a category of data to be written into each of the memory units or a priority for performing a garbage collection operation on each of the memory units according to the number of dies of each of the memory units.

A memory control circuit unit of the disclosure is configured to control a rewritable non-volatile memory module. The rewritable non-volatile memory module includes a plurality of memory units. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to receive a write command from the host system. The memory management circuit is further configured to detect a plurality of data writing speeds of the memory units. Each of the memory units has a number of dies of memory dies, and is coupled to the memory control circuit unit through one of a plurality of data input/output buses. The memory management circuit is further configured to determine an initial write volume of each of the memory units according to the number of dies of each of the memory units. The memory management circuit is further configured to calculate at least one compensation data volume according to the data writing speeds and the initial write volume of each of the memory units. Moreover, the memory management circuit is further configured to write a write data corresponding to the write command into the memory units according to the initial write volume of each of the memory units and the at least one compensation data volume.

In an embodiment of the disclosure, the memory management circuit is further configured to determine a write ratio between the memory units according to the number of dies of each of the memory units. Moreover, the memory management circuit is further configured to calculate the initial write volume of each of the memory units according to the write ratio and a unit of write.

In an embodiment of the disclosure, values obtained from dividing a sum of the initial write volume of each of the memory units and the compensation data volume corresponding to each of the memory units by the data writing speed of each of the memory units are the same.

In an embodiment of the disclosure, the memory management circuit is further configured to transfer a first data corresponding to a sum of a first initial write volume of a first memory unit in the memory units and a first compensation data volume in the write data to the first memory unit through a first data input/output bus coupled to the first memory unit.

In an embodiment of the disclosure, the memory management circuit is further configured to detect a first data writing speed of a first memory unit and a second data writing speed of a second memory unit in the memory units. A first number of dies of the memory dies in the first memory unit is greater than a second number of dies of the memory dies in the second memory unit. The memory management circuit is further configured to determine a first initial write volume of the first memory unit according to the first number of dies, and to determine a second initial write volume of the second memory unit according to the second number of dies. The memory management circuit is further configured to calculate the at least one compensation data volume according to the first data writing speed, the second data writing speed, the first initial write volume, and the second initial write volume. Moreover, the memory management circuit is further configured to transfer the write data to the first memory unit according to the first initial write volume and the at least one compensation data volume.

In an embodiment of the disclosure, after transferring the write data to the first memory unit according to the first initial write volume and the at least one compensation data volume, the memory management circuit is further configured to transfer the write data to the second memory unit according to the second initial write volume.

In an embodiment of the disclosure, the rewritable non-volatile memory module is a quad level cell (QLC) NAND-type flash memory module. The number of dies of at least one of the memory units is different from the number of dies of other ones of the memory units.

In an embodiment of the disclosure, the memory management circuit is further configured to determine a category of data to be written into each of the memory units or a priority for performing a garbage collection operation on each of the memory units according to the number of dies of each of the memory units.

Based on the foregoing, in the data storing allocation method, the memory storage apparatus, and the memory control circuit unit provided in the exemplary embodiments of the disclosure, the compensation data volumes can be determined according to the data writing speeds and the numbers of dies of the memory units, and data corresponding to the compensation data volumes can be additionally transferred to the memory units. By transferring a relatively great volume of data to a memory unit with a relatively fast data writing speed, the memory dies in each memory unit can be in a busy state at the same time. Accordingly, the volume of write data of each memory unit can be balanced in real time, thus improving data write efficiency of the memory storage apparatus.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
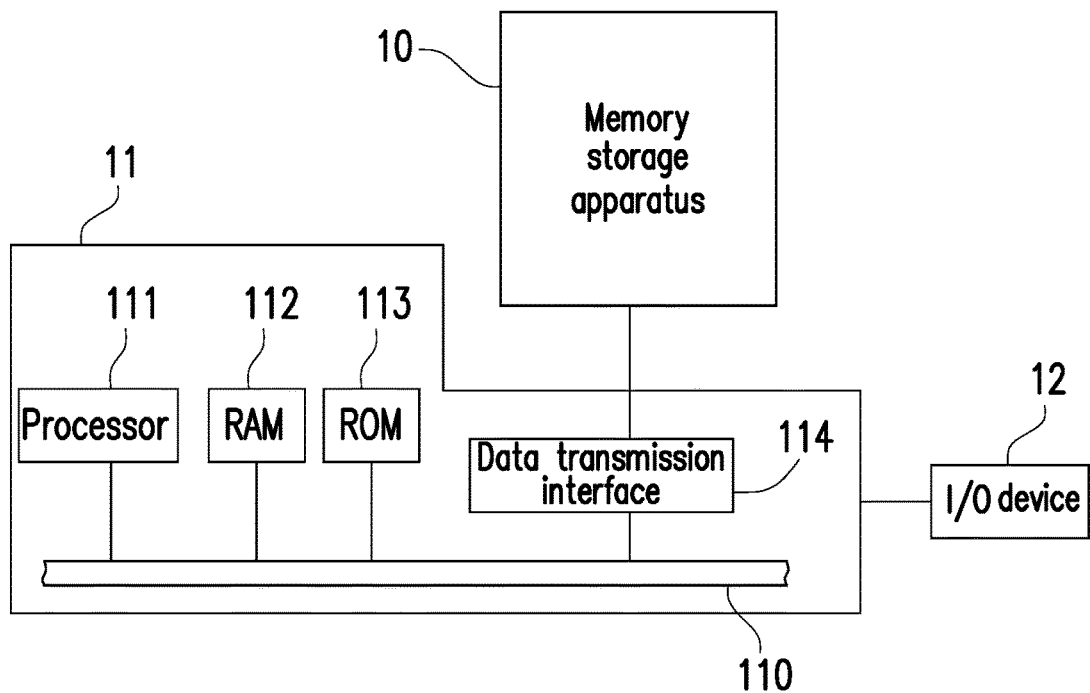
FIG. 1 is a schematic diagram of a host system, a memory storage apparatus, and an input/output (I/O) device according to an exemplary embodiment of the disclosure.

The terms "first" and "second" mentioned throughout this specification (including the claims) serve to name elements or to distinguish different embodiments or ranges, and not to limit the upper or lower bound of the number of elements nor to limit the sequence of elements. In addition, wherever possible, elements/members/steps using the same reference numerals in the drawings and embodiments refer to the same or similar parts. Cross-reference may be made to related descriptions for elements/components/steps using the same reference numerals or using the same terms in different embodiments. These embodiments are only part of the disclosure and do not disclose all possible implementations of the disclosure.

Generally speaking, a memory storage apparatus (also referred to as a memory storage system) includes a rewritable non-volatile memory module and a controller (also referred to as a control circuit unit). Typically, the memory storage apparatus is used together with a host system for the host system to write data into the memory storage apparatus or read data from the memory storage apparatus.

Figure 2:
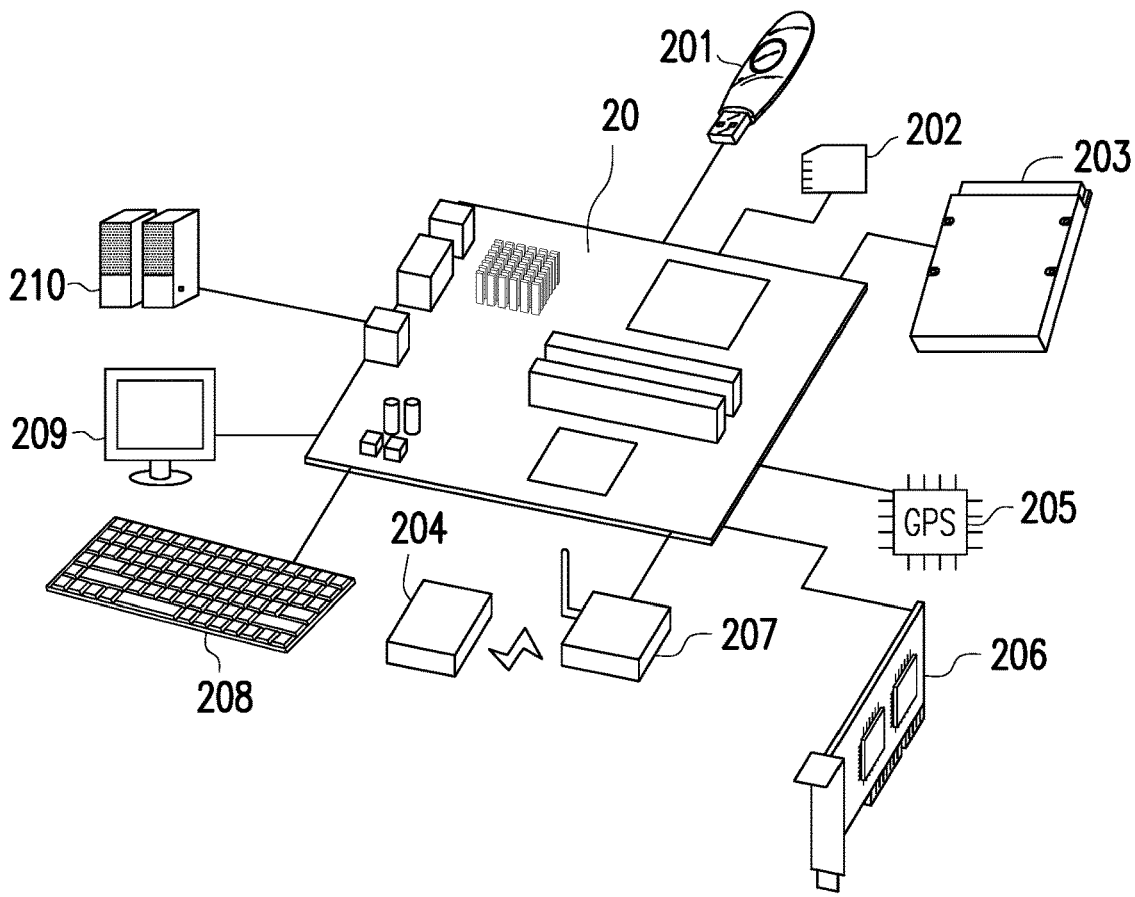
FIG. 2 is a schematic diagram of a host system, a memory storage apparatus, and an I/O device according to another exemplary embodiment of the disclosure.

FIG. 1 is a schematic diagram of a host system, a memory storage apparatus, and an input/output (I/O) device according to an exemplary embodiment of the disclosure. FIG. 2 is a schematic diagram of a host system, a memory storage apparatus, and an I/O device according to another exemplary embodiment of the disclosure.

With reference to FIG. 1 and FIG. 2, a host system 11 generally includes a processor 111, a random access memory (RAM) 112, a read only memory (ROM) 113, and a data transfer interface 114. The processor 111, the RAM 112, the ROM 113, and the data transfer interface 114 are all coupled to a system bus 110.

In this exemplary embodiment, the host system 11 is coupled to a memory storage apparatus 10 through the data transfer interface 114. For example, the host system 11 may store data into the memory storage apparatus 10 or read data from the memory storage apparatus 10 through the data transfer interface 114. In addition, the host system 11 is coupled to an I/O device 12 through the system bus 110. For example, the host system 11 may transmit an output signal to the I/O device 12 or receive an input signal from the I/O device 12 through the system bus 110.

In this exemplary embodiment, the processor 111, the RAM 112, the ROM 113, and the data transfer interface 114 may be disposed on a motherboard 20 of the host system 11. The data transfer interface 114 may include one or more data transfer interfaces. Through the data transfer interface 114, the motherboard 20 may be coupled to the memory storage apparatus 10 in a wired or wireless manner. The memory storage apparatus 10 may be, for example, a flash drive 201, a memory card 202, a solid state drive (SSD) 203, or a wireless memory storage apparatus 204. The wireless memory storage apparatus 204 may be, for example, a near-field communication (NFC) memory storage apparatus, a Wireless Fidelity (WiFi) memory storage apparatus, a Bluetooth memory storage apparatus, a Bluetooth Low Energy memory storage apparatus (e.g., iBeacon), or any other memory storage apparatus on a basis of various modes of wireless communication technology. In addition, the motherboard 20 may also be coupled to various modes of I/O devices such as a Global Positioning System (GPS) module 205, a network interface card 206, a wireless transfer device 207, a keyboard 208, a screen 209, or a speaker 210 through the system bus 110. For example, in an exemplary embodiment, the motherboard 20 may access the wireless memory storage apparatus 204 through the wireless transfer device 207.

Figure 3:
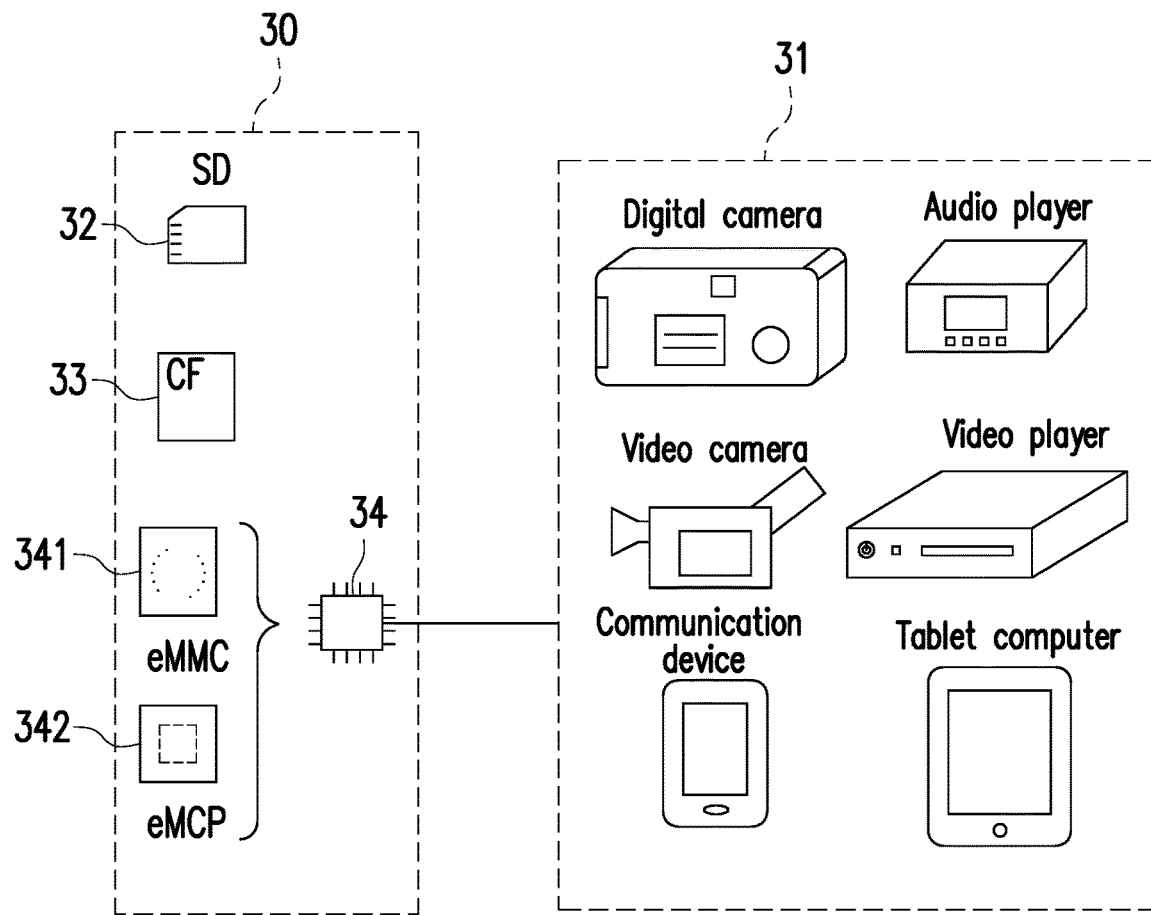
FIG. 3 is a schematic diagram of a host system and a memory storage apparatus according to another exemplary embodiment of the disclosure.

In an exemplary embodiment, the host system may be any system that substantially works with a memory storage apparatus to store data. In the above exemplary embodiment, a computer system is taken for describing the host system. However, FIG. 3 is a schematic diagram of a host system and a memory storage apparatus according to another exemplary embodiment of the disclosure. With reference to FIG. 3, in another exemplary embodiment, a host system 31 may be a system such as a digital camera, a video camera, a communication device, an audio player, a video player, or a tablet computer, and a memory storage apparatus 30 may be various non-volatile memory storage apparatuses such as a Secure Digital (SD) card 32, a Compact Flash (CF) card 33, or an embedded storage apparatus 34 used by the host system 31. The embedded storage apparatus 34 includes embedded storage apparatuses in various forms, such as an embedded Multi Media Card (eMMC) 341 and/or an embedded Multi Chip Package (eMCP) storage apparatus 342, which directly couple the memory module to the substrate of the host system.

Figure 4:
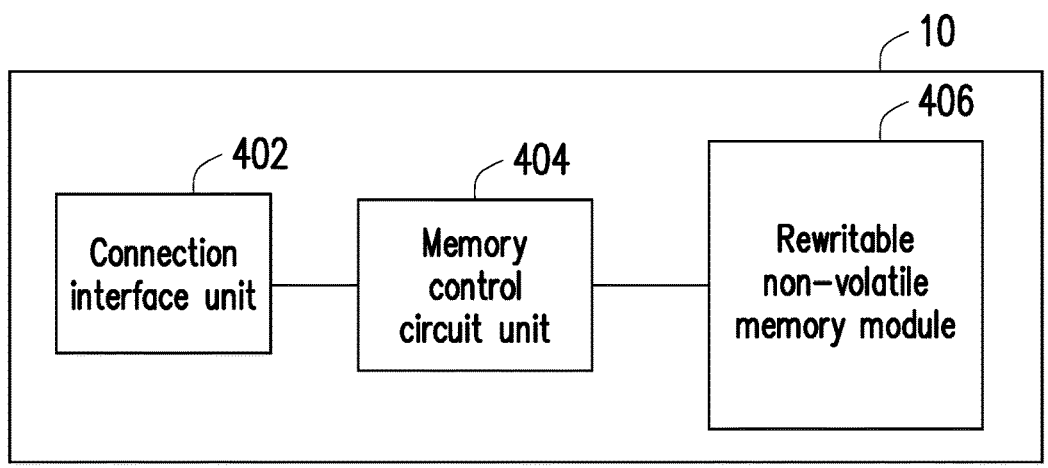
FIG. 4 is a schematic block diagram of a memory storage apparatus according to an exemplary embodiment of the disclosure.

FIG. 4 is a schematic block diagram of a memory storage apparatus according to an exemplary embodiment of the disclosure. With reference to FIG. 4, the memory storage apparatus 10 includes a connection interface unit 402, a memory control circuit unit 404, and a rewritable non-volatile memory module 406.

The connection interface unit 402 is configured to couple the memory storage apparatus to the host system 11. The memory storage apparatus 10 may communicate with the host system 11 through the connection interface unit 402. In this exemplary embodiment, the connection interface unit 402 is compatible with the Serial Advanced Technology Attachment (SATA) standard. However, it should be understood that the disclosure is not limited thereto. The connection interface unit 402 may also be compliant with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) interface standard, Ultra High Speed-II (UHS-II) interface standard, Memory Stick (MS) interface standard, Multi-Chip Package (MCP) interface standard, Multimedia Card (MMC) interface standard, embedded Multimedia Card (eMMC) interface standard, Universal Flash Storage (UFS) interface standard, embedded Multi-Chip Package (eMCP) interface standard, Compact Flash (CF) interface standard, Integrated Device Electronics (IDE) standard, or other suitable standards. The connection interface unit 402 may be packaged into the same chip with the memory control circuit unit 404. Alternatively, the connection interface unit 402 may be arranged outside a chip including the memory control circuit unit 404.

The memory control circuit unit 404 is configured to execute a plurality of logic gates or control commands implemented in a hardware form or firmware form and performs operations such as writing, reading, and erasing data in the rewritable non-volatile memory module 406 according to commands of the host system 11.

The rewritable non-volatile memory module 406 is coupled to the memory control circuit unit 404 and configured to store data written by the host system 11. The rewritable non-volatile memory module 406 may be a single level cell (SLC) NAND-type flash memory module (i.e., a flash memory module that can store 1 bit in one memory cell), a multi level cell (MLC) NAND-type flash memory module (i.e., a flash memory module that can store 2 bits in one memory cell), a triple level cell (TLC) NAND-type flash memory module (i.e., a flash memory module that can store 3 bits in one memory cell), a quad level cell (QLC) NAND-type flash memory module (i.e., a flash memory module that can store 4 bits in one memory cell), other flash memory modules, or other memory modules having the same properties.

Each memory cell in the rewritable non-volatile memory module 406 stores one or more bits with a change in voltages (hereinafter also referred to as threshold voltage). Specifically, a charge trapping layer is present between a control gate and a channel of each memory cell. By applying a write voltage to the control gate, the amount of electrons in the charge trapping layer may be changed, thus changing the threshold voltage of the memory cell. Such operation of changing the threshold voltage of the memory cell is also referred to as "writing data into the memory cell" or "programming the memory cell". As the threshold voltage changes, each memory cell in the rewritable non-volatile memory module 406 has a plurality of storage states. By applying a read voltage, it is possible to determine the storage state to which the memory cell belongs, thus obtaining one or more bits stored in the memory cell.

In this exemplary embodiment, the memory cells of the rewritable non-volatile memory module 406 may form a plurality of physical programming units, and the physical programming units may form a plurality of physical erase units. Specifically, memory cells on the same word line may form one or more physical programming units. If each memory cell can store more than 2 bits, the physical programming unit on the same word line may be classified into at least a lower physical programming unit and an upper physical programming unit. For example, the least significant bit (LSB) of a memory cell belongs to the lower physical programming unit, and the most significant bit (MSB) of a memory cell belongs to the upper physical programming unit. Generally speaking, in the MLC NAND-type flash memory, a data writing speed of the lower physical programming unit is greater than a data writing speed of the upper physical programming unit, and/or the reliability of the lower physical programming unit is higher than the reliability of the upper physical programming unit.

In this exemplary embodiment, the physical programming unit is the minimum unit of programming. In other words, the physical programming unit is the minimum unit of write data. For example, the physical programming unit may be a physical page or a physical sector. If the physical programming unit is a physical page, the physical programming unit may include a data bit region and a redundancy bit region. The data bit region includes a plurality of physical sectors configured to store user data, and the redundancy bit region is configured to store system data (e.g., management data such as error correcting codes). In this exemplary embodiment, the data bit region includes 32 physical sectors, and the size of one physical sector is 512 bytes (B). However, in other exemplary embodiments, the data bit region may also include 8, 16, or more or less physical sectors, and the size of each physical sector may also be larger or smaller. In addition, the physical erase unit is the minimal unit for erasing. In other words, each physical erase unit includes the smallest number of memory cells to be erased together. For example, the physical erase unit is a physical block.

Figure 5:
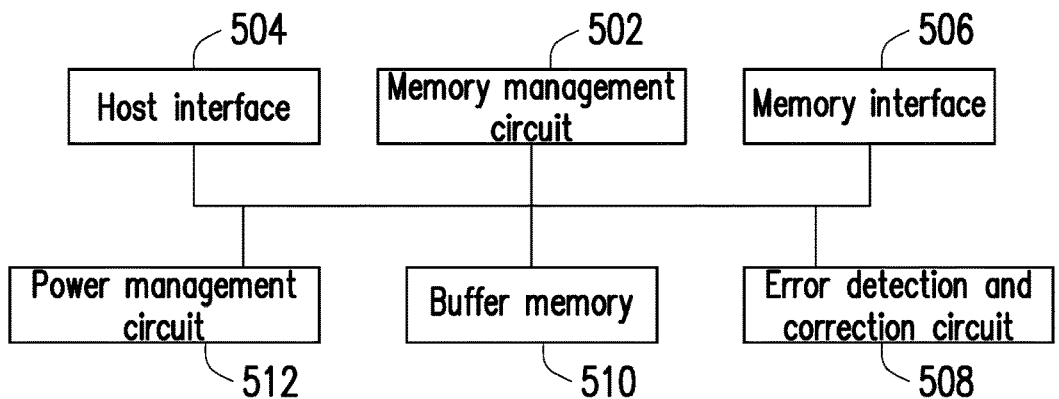
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. With reference to FIG. 5, the memory control circuit unit 404 includes a memory management circuit 502, a host interface 504, and a memory interface 506.

The memory management circuit 502 is configured to control the overall operation of the memory control circuit unit 404. Specifically, there exist a plurality of control commands in the memory management circuit 502. During operation of the memory storage apparatus 10, the control commands are executed to perform operations such as writing, reading, and erasing data. Hereinafter, description of the operation of the memory management circuit 502 is equivalent to description of the operation of the memory control circuit unit 404.

In this exemplary embodiment, the control commands of the memory management circuit 502 are implemented in a firmware form. For example, the memory management circuit 502 has a microprocessor unit (not shown) and a read only memory (not shown), and the control commands are programmed into the read only memory. During operation of the memory storage apparatus 10, the control commands are executed by the microprocessor unit to perform operations such as writing, reading, and erasing data.

In another exemplary embodiment, the control commands of the memory management circuit 502 may also be stored in a specific region of the rewritable non-volatile memory module 406 (e.g., a system region dedicated to storing system data in the memory module) in a form of programming code. In addition, the memory management circuit 502 has a microprocessor unit (not shown), a read only memory (not shown), and a random access memory (not shown). In particular, there exists a boot code in the read only memory. When the memory control circuit unit 404 is enabled, the microprocessor unit first executes the boot code to load the control commands stored in the rewritable non-volatile memory module 406 into the random access memory of the memory management circuit 502. After that, the microprocessor unit operates the control commands to perform operations such as writing, reading, and erasing data.

In addition, in another exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cell or memory cell group of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence may each include one or more programming codes or command codes and be configured to command the rewritable non-volatile memory module 406 to perform corresponding operations such as writing, reading, and erasing. In an exemplary embodiment, the memory management circuit 502 may also issue other types of command sequences to the rewritable non-volatile memory module 406 to command to perform corresponding operations.

The host interface 504 is coupled to the memory management circuit 502. The memory management circuit 502 may communicate with the host system 11 through the host interface 504. The host interface 504 may be configured to receive and identify commands and data transmitted by the host system 11. For example, the commands and data transmitted by the host system 11 may be transmitted to the memory management circuit 502 through the host interface 504. In addition, the memory management circuit 502 may transmit data to the host system 11 through the host interface 504. In this exemplary embodiment, the host interface 504 is compatible with the SATA standard. However, it should be understood that the disclosure is not limited thereto. The host interface 504 may also be compatible with the PATA standard, IEEE 1394 standard, PCI Express standard, USB standard, SD standard, UHS-I interface standard, UHS-II interface standard, MS standard, MMC standard, eMMC standard, UFS standard, CF standard, IDE standard, or other suitable data transfer standards.

The memory interface 506 is coupled to the memory management circuit 502 and configured to access the rewritable non-volatile memory module 406. In other words, data to be written into the rewritable non-volatile memory module 406 is converted through the memory interface 506 into a format acceptable to the rewritable non-volatile memory module 406. Specifically, if the memory management circuit 502 is to access the rewritable non-volatile memory module 406, the memory interface 506 transmits corresponding command sequences. For example, the command sequences may include write a command sequence commanding to write data, a read command sequence commanding to read data, an erase command sequence command to erase data, and corresponding command sequences configured to command various memory operations (e.g., changing the read voltage level, performing a garbage collection operation, or the like). The command sequences are, for example, generated by the memory management circuit 502 and transmitted to the rewritable non-volatile memory module 406 through the memory interface 506. The command sequences may include one or more signals or data on the bus. The signals or data may include command codes or programming codes. For example, a read command sequence may include information, for example, an identification code and a memory address, that is read.

In an exemplary embodiment, the memory control circuit unit 404 further includes an error detection and correction circuit 508, a buffer memory 510, and a power management circuit 512.

The error detection and correction circuit 508 is coupled to the memory management circuit 502 and configured to perform an error detection and correction operation to ensure correctness of data. Specifically, when the memory management circuit 502 receives a write command from the host system 11, the error detection and correction circuit 508 generates a corresponding error correcting code (ECC) and/or error detecting code (EDC) for data corresponding to the write command, and the memory management circuit 502 writes the data corresponding to the write command and the corresponding error correcting code and/or error detecting code into the rewritable non-volatile memory module 406. After that, when the memory management circuit 502 reads data from the rewritable non-volatile memory module 406, the memory management circuit 502 also reads the error correcting code and/or error detecting code corresponding to the data. Moreover, the error detection and correction circuit 508 performs an error detection and correction operation on the read data according to the error correcting code and/or error detecting code.

The buffer memory 510 is coupled to the memory management circuit 502 and configured to temporarily store data and commands from the host system 11 or data from the rewritable non-volatile memory module 406. The buffer memory 510 may be a static random access memory (SRAM), a dynamic random access memory (DRAM), or the like, which is not limited by the disclosure. The power management circuit 512 is coupled to the memory management circuit 502 and configured to control the power of the memory storage apparatus 10.

In an exemplary embodiment, the rewritable non-volatile memory module 406 of FIG. 4 is also referred to as a flash memory module, and the memory control circuit unit 404 is also referred to as a flash memory controller for controlling the flash memory module. In an exemplary embodiment, the memory management circuit 502 of FIG. 5 is also referred to as a flash memory management circuit.

Figure 6:
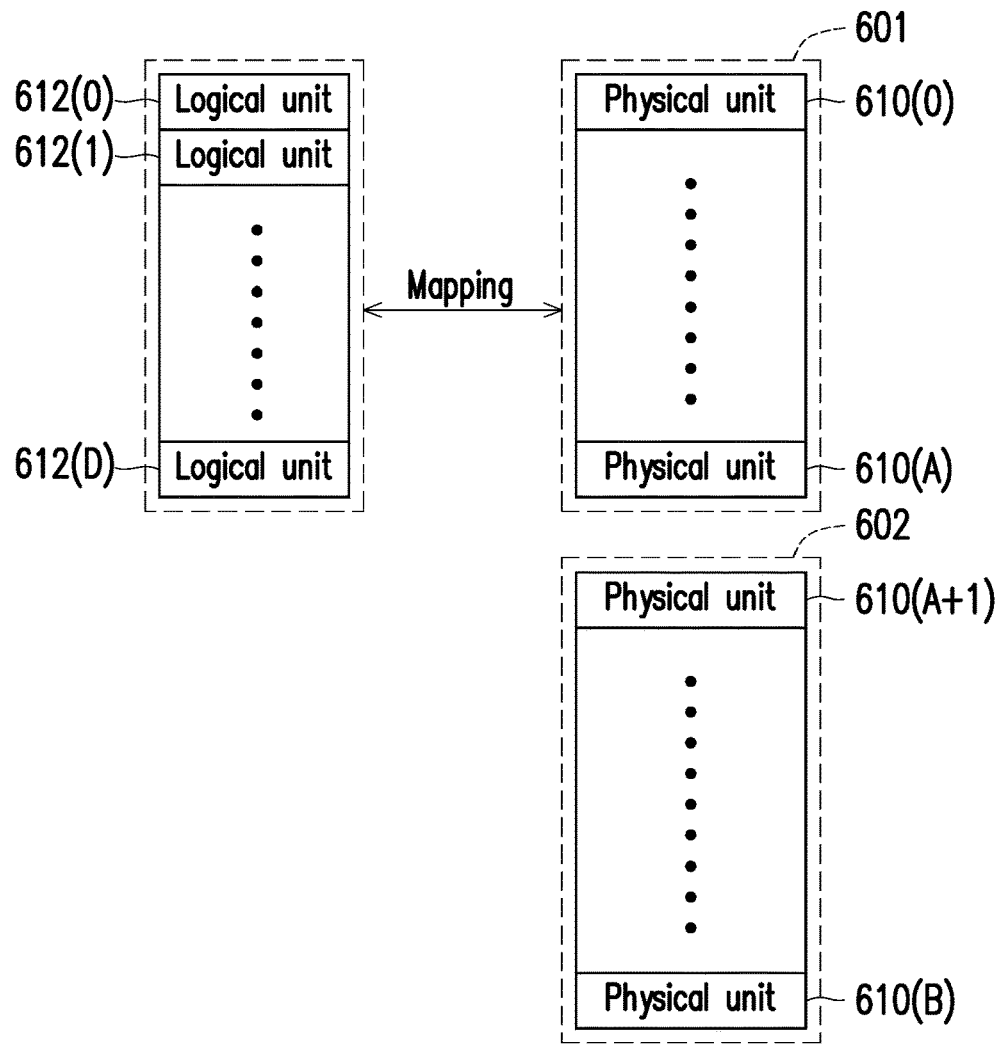
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. With reference to FIG. 6, the memory management circuit 502 may logically group physical units 610(0) to 610(B) of the rewritable non-volatile memory module 406 into a storage region 601 and a spare region 602. The physical units 610(0) to 610(A) in the storage region 601 and the physical units 610(A+1) to 610(B) in the spare region 602 are configured to store data from the host system 11. Specifically, the physical units in the storage region 601 are regarded as physical units having already stored data, and the physical units in the spare region 602 are configured to replace the physical units in the storage region 601. In other words, when the memory management circuit 502 receives the write command and data to be written from the host system 11, the memory management circuit 502 writes the data using physical units retrieved from the spare region 602 in place of the physical units in the storage region 601.

In this exemplary embodiment, each physical unit refers to one physical erase unit. However, in another exemplary embodiment, one physical unit may also refer to one physical address, one physical programming unit, or formed by a plurality of continuous or discontinuous physical addresses. The memory management circuit 502 is provided with logical units 612(0) to 612(C) to be mapped to the physical units 610(0) to 610(A) in the storage region 601. In this exemplary embodiment, each logical unit refers to one logical address. However, in another exemplary embodiment, one logical unit may also refer to one logical programming unit, one logical erase unit, or formed by a plurality of continuous or discontinuous logical addresses. In addition, each of the logical units 612(0) to 612(C) may be mapped to one or more physical units.

The memory management circuit 502 may record the mapping relationship (also referred to as the logical-to-physical address mapping relationship) between the logical units and the physical units in at least one logical-to-physical address mapping table. When the host system 11 is to read data from the memory storage apparatus 10 or to write data into the memory storage apparatus 10, the memory management circuit 502 may perform a data access operation on the memory storage apparatus 10 according to the logical-to-physical address mapping table.

In an exemplary embodiment, the rewritable non-volatile memory module 406 may be provided with one or more memory units. Each memory unit is coupled to the memory management circuit 502 through an independent data input/output (I/O) bus. In this exemplary embodiment, each memory unit may include one or more memory dies, and each memory die has a plurality of physical units. In other words, each memory die is coupled to the memory management circuit 502 through one of the data input/output buses.

Generally speaking, the procedures of writing data into the physical unit may be divided into two parts, i.e., command and data transfer, and data programming. When data is to be stored in the physical unit of the memory die, the memory management circuit 502 first transfers the commands and data to a buffer in the memory die. After that, the memory die programs (writes) the data in the buffer to the physical unit. During the period when the memory management circuit 502 transfers the data to the memory die, the memory die is in a transfer state. Moreover, during the period when the data is programmed into the physical unit, the memory die is in a busy state.

To improve a data writing speed of the memory storage apparatus, the memory storage apparatus 10 may be provided with a plurality of memory dies and may write data in an interleaved mode and a parallel mode. For example, taking the rewritable non-volatile memory module 406 provided with a first memory die and a second memory die coupled to the memory management circuit 502 through the same data input/output bus as an example, the first memory die and the second memory die belong to the same memory unit. When the host system 11 is to store a plurality of pieces of data in the memory storage apparatus 10 in the interleaved mode, the memory management circuit 502 may transfer one of the pieces of data (e.g., data corresponding to one physical unit) to the first memory die. After that, when the first memory die is in a busy state, the memory management circuit 502 may transfer another piece of data to the second memory die.

As such, data is transferred to the first memory die and the second memory die in an interleaved manner, thus reducing the time of data writing. In addition, since each memory unit in the rewritable non-volatile memory module 406 is coupled to the memory management circuit 502 through an independent data input/output bus, in the parallel mode, the memory management circuit 502 may transfer a write data to a plurality of memory units through a plurality of data input/output buses at the same time, thus increasing the data writing speed. In other words, the memory management circuit 502 performs transfer and write at the same time on data to be transferred to different memory units through the data input/output bus coupled to each memory unit.

It is worth noting that different memory units in the rewritable non-volatile memory module 406 may have different numbers of dies of memory dies depending on design requirements. Taking the QLC NAND-type flash memory module as an example, a capacity of a single memory die of the QLC NAND-type flash memory module can reach 1.33 TB. However, a memory capacity of flash memory or other storage apparatuses on the market is basically calculated by a power of two, such as 256 GB, 512 GB, 1 TB, and the like. It is inevitable for the QLC NAND-type flash memory module to be mounted with an odd number of memory dies to meet the basic memory capacity. For example, a flash memory having a memory capacity of 4 TB may include three memory dies. When two of the three memory dies are coupled to the memory management circuit 502 through the same data input/output bus, this causes the remaining one memory die to be independently coupled to the memory management circuit 502 through one data input/output bus, such that different memory units have different numbers of dies of memory dies. In this exemplary embodiment, in the rewritable non-volatile memory module 406, a number of dies of memory dies in at least one memory unit is different from a number of dies of memory dies in other memory units.

Figure 7:
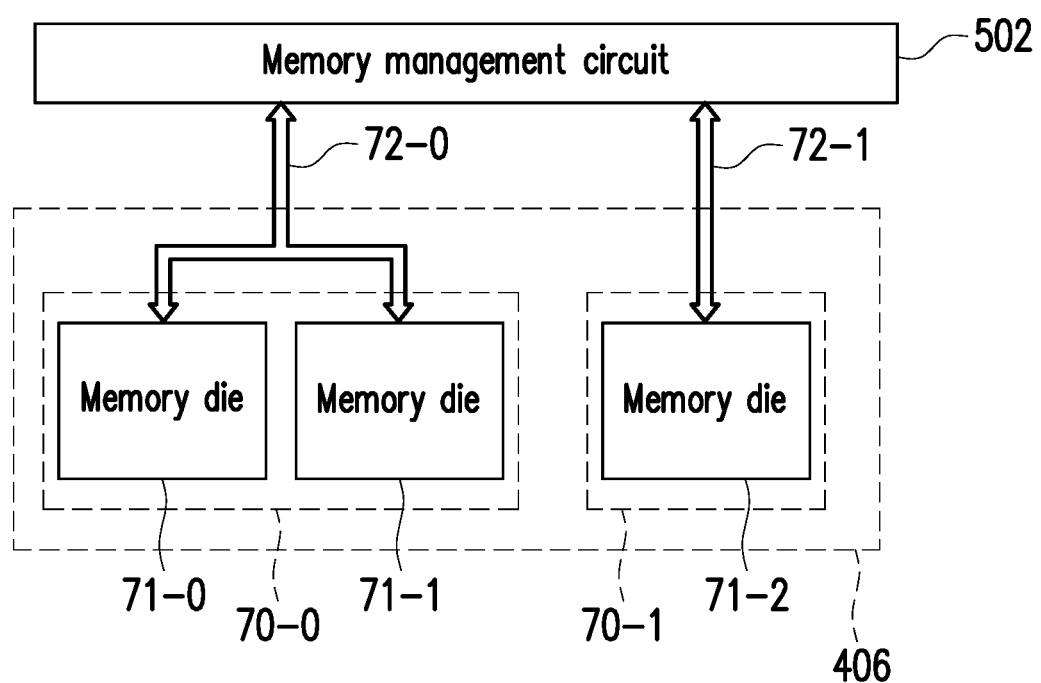
FIG. 7 is a schematic diagram of a memory management circuit and a plurality of memory units according to an exemplary embodiment of the disclosure.

FIG. 7 is a schematic diagram of a memory management circuit and a plurality of memory units according to an exemplary embodiment of the disclosure. The rewritable non-volatile memory module 406 of this exemplary embodiment has three memory dies. In other words, the total number of memory dies is an odd number. For convenience of description below, the rewritable non-volatile memory module 406 including three memory dies will be taken as an embodiment. Nonetheless, depending on requirements in different embodiments, the total number of memory dies included in the rewritable non-volatile memory module 406 may also be designed to be five, seven, or more or other different numbers of memory dies may be designed to be coupled through the same data input/output bus to the memory management circuit 502. The number of dies of memory dies is not limited by the disclosure.

With reference to FIG. 7, the rewritable non-volatile memory module 406 has a memory unit 70-0 and a memory unit 70-1. In this exemplary embodiment, the memory unit 70-0 has a memory die 71-0 and a memory die 71-1, and the memory unit 70-1 has a memory die 71-2. In other words, the memory unit 70-0 and the memory unit 70-1 have different numbers of dies of memory dies.

In this exemplary embodiment, the memory unit 70-0 is coupled to the memory management circuit 502 through a data input/output bus 72-0, and the memory unit 70-1 is coupled to the memory management circuit 502 through an input/output bus 72-1. The memory management circuit 502 transfers data to the memory units 70-0, 70-1 or receives data from the memory units 70-0, 70-1 through the data input/output bus. Specifically, the memory management circuit 502 transfers commands and data to the memory die 71-0 and the memory die 71-1 through the data input/output bus 72-0, and transfers commands and data to the memory die 71-2 through the data input/output bus 72-1.

Figure 8:
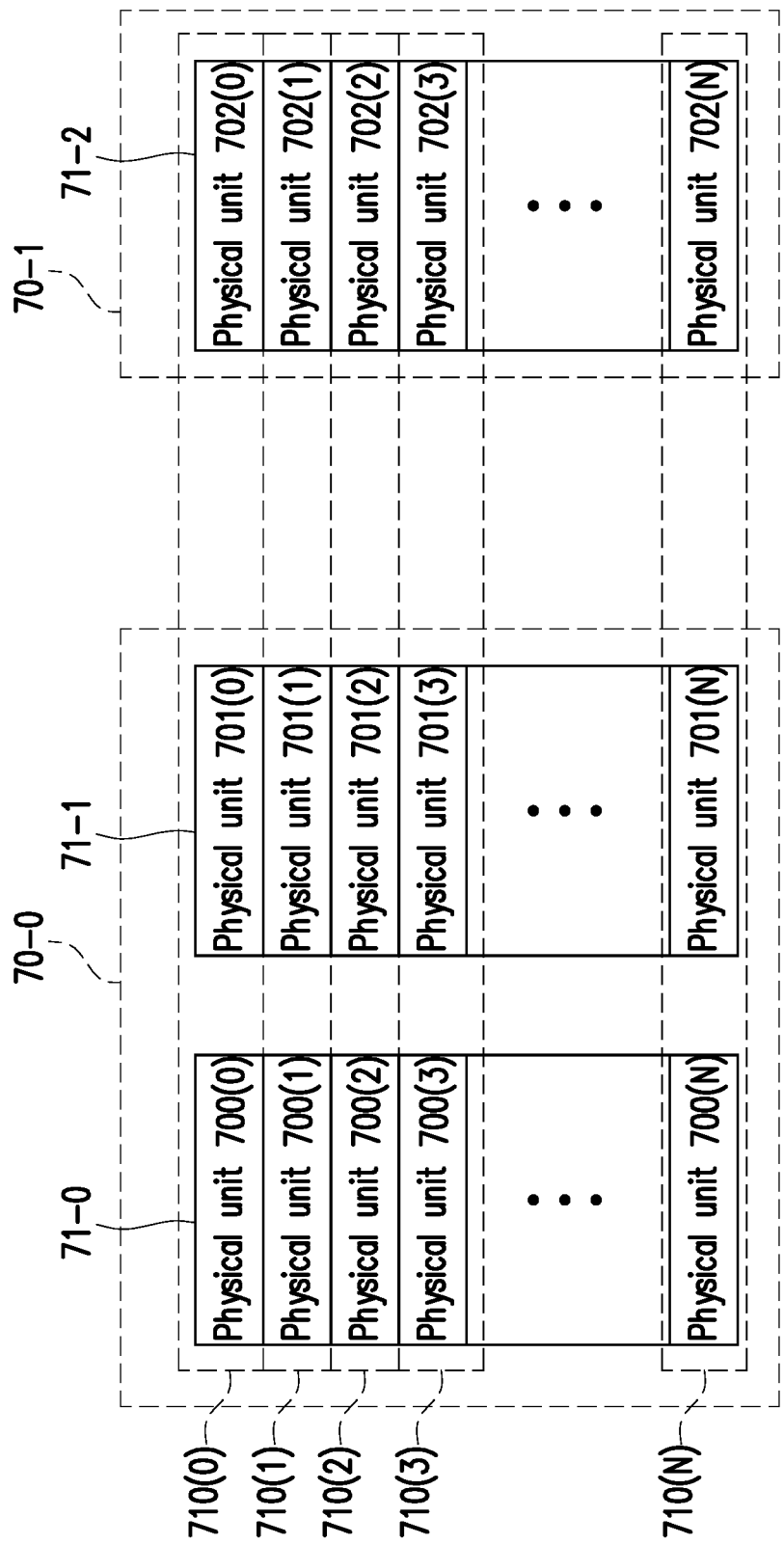
FIG. 8 is a schematic diagram of a super physical unit according to an exemplary embodiment of the disclosure.

In an exemplary embodiment, the memory management circuit 502 may group physical units in each memory die into a plurality of super physical units and takes the super physical unit as a unit of performing management. For example, FIG. 8 is a schematic diagram of a super physical unit according to an exemplary embodiment of the disclosure. With reference to FIG. 7 and FIG. 8, the memory management circuit 502 may group physical units 700(0) to 700(N) of the memory die 71-0, physical units 701(0) to 701(N) of the memory die 71-1, and physical units 702(0) to 702(N) of the memory die 71-2 into super physical units 710(0) to 710(N). In this exemplary embodiment, the memory management circuit 502 may increase the speed of accessing data by using the parallel mode and the interleaved mode. In other words, when one super physical unit is to be written, since the super physical unit is formed by physical units belonging to different memory units, in the parallel mode, the memory management circuit 502 transfers and writes data corresponding to different physical units respectively through a plurality of data input/output buses (e.g., the data input/output bus 72-0 and the data input/output bus 72-1 shown in FIG. 7).

Furthermore, since the memory unit 70-0 includes two memory dies, the memory management circuit 502 may transfer data to the two memory dies 71-0 and 71-1 in the memory unit 70-0 in an interleaved manner to increase a data writing speed. However, since the memory unit 70-1 only has a single memory die, it is not possible to be interleaved with another memory die in an interleaved mode. Accordingly, when programming the physical unit in the memory die 71-2, the memory management circuit 502 is required to wait for the memory die 71-2 to reply ready before it can proceed to program the next physical unit in the memory die 71-2. As a result, data writing speeds of the memory unit 70-0 and the memory unit 70-1 are inconsistent, affecting the overall writing efficiency of the memory storage apparatus 10.

In an exemplary embodiment, the memory management circuit 502 may detect the data writing speed of each memory unit. The data writing speed is, for example, the volume of data transferred per unit time. In addition, the memory management circuit 502 may determine an initial write volume of each memory unit according to the number of dies of each memory unit. Specifically, the memory management circuit 502 may determine a write ratio between the memory units according to the number of dies of each memory unit, and calculate the initial write volume of each of the memory unit according to the write ratio and a unit of write. The unit of write is, for example, one physical unit, and is not limited by the disclosure.

In this exemplary embodiment, the memory management circuit 502 may calculate a compensation data volume according to the data writing speed of the memory unit and the initial write volume of the memory unit. For example, assuming that there are N memory units, the memory management circuit 502 calculates the compensation data volume corresponding to each memory unit, for example, by Equation (1):

$$\frac{A \pm \Delta A}{V_A} = \frac{B \pm \Delta B}{V_B} = \ldots = \frac{N \pm \Delta N}{V_N} \qquad (1)$$

In the above equation, A, B, . . . , and N represent respective initial write volumes of memory units A to N, $\Delta A$, $\Delta B$, . . . , and $\Delta N$ represent respective compensation data volumes of the memory units A to N, and $V_A$, $V_B$, ..., and $V_N$ represent respective data writing speeds of the memory units A to N. In other words, in this exemplary embodiment, values obtained from dividing a sum of the initial write volume of each memory unit and the compensation data volume corresponding to the memory unit divided by the data writing speed of the memory unit are the same.

After that, the memory management circuit 502 may write a write data corresponding to the write command into the memory unit according to the initial write volume and the compensation data volume. To be specific, according to a data write sequence, the memory management circuit 502 transfers data corresponding to the sum of the initial write volume of each memory unit and the compensation data volume in the write data to the memory unit through the data input/output bus coupled to the memory unit. Moreover, the memory unit writes the received data into the physical unit of the memory die. Accordingly, with the compensation data volume calculated in real time, a relatively great volume of data can be transferred to the memory unit with a relatively fast data writing speed through the data input/output bus coupled to the memory unit, thus improving the overall data writing performance of the memory storage apparatus 10.

Figure 9:
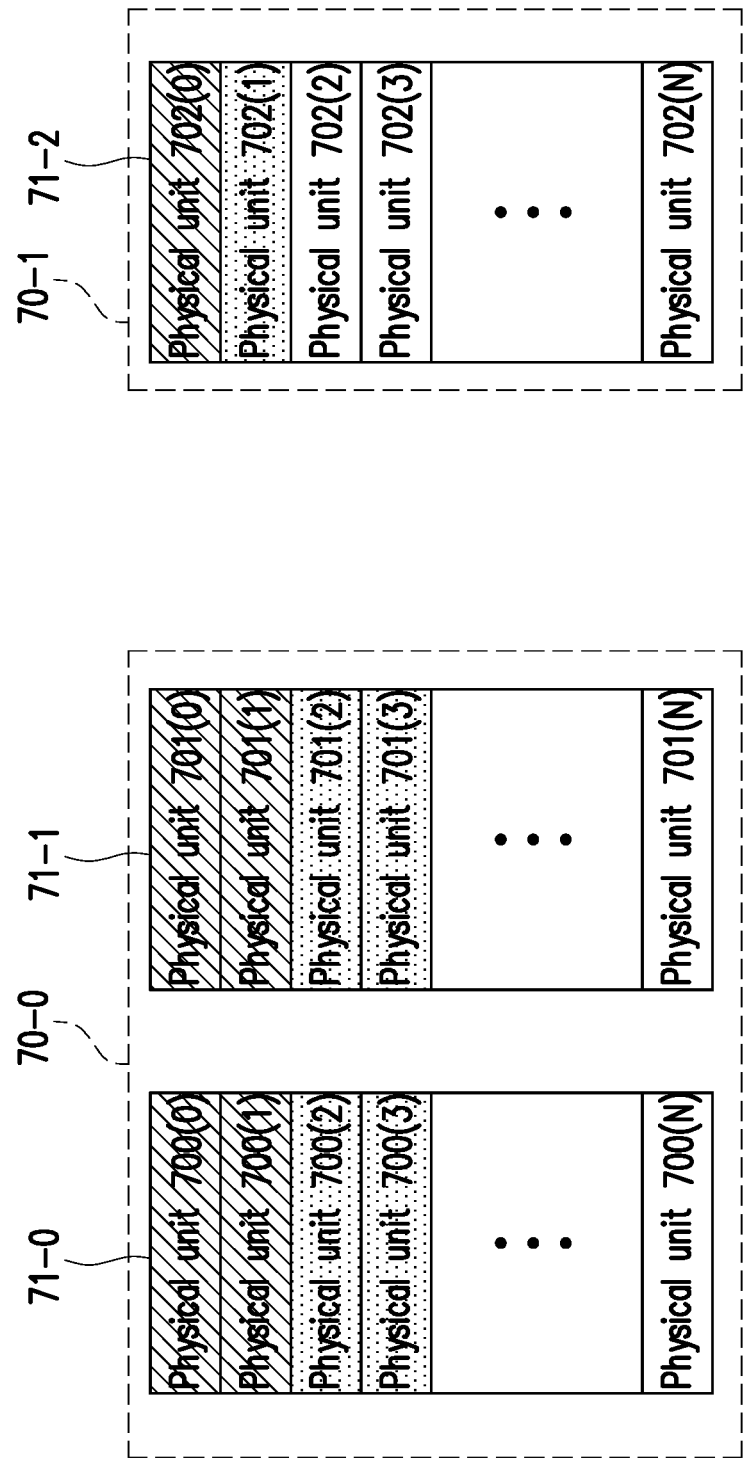
FIG. 9 shows an example of a physical unit corresponding to a write command according to an exemplary embodiment of the disclosure.

For example, FIG. 9 shows an example of a physical unit corresponding to a write command according to an exemplary embodiment of the disclosure. The memory unit 70-0 (also referred to as a first memory unit) and the memory unit 70-1 (also referred to as a second memory unit) in FIG. 9 respectively correspond to the memory unit 70-0 and the memory unit 70-1 in FIG. 7. With reference to FIG. 7 first, in FIG. 7, the memory unit 70-0 has two memory dies 71-0 and 71-1, and the memory unit 70-1 has one memory die 71-2. In other words, a number of dies (also referred to as a first number of dies) corresponding to the memory unit 70-0 is two, and a number of dies (also referred to as a second number of dies) corresponding to the memory unit 70-1 is one. In other words, the first number of dies is greater than the second number of dies. The memory management circuit 502 may determine a write ratio between the memory unit 70-0 and the memory unit 70-1 to be 2:1. In this exemplary embodiment, according to the write ratio and the write unit, the memory management circuit 502 calculates an initial write volume (also referred to as a first initial write volume) of the memory unit 70-0 as a data volume of two units of write, and calculates an initial write volume (also referred to as a second initial write volume) of the memory unit 70-1 as a data volume of one unit of write.

In this exemplary embodiment, after calculating the initial write volumes of the memory unit 70-0 and the memory unit 70-1, according to the data writing speed (also referred to as a first data writing speed) and the first initial write volume of the memory unit 70-0 and the data writing speed (also referred to as a second data writing speed) and the second initial write volume of the memory unit 70-1, the memory management circuit 502 may calculate compensation data volumes corresponding to the memory unit 70-0 and the memory unit 70-1 by Equation (2):

$$\frac{A \pm \Delta A}{V_A} = \frac{B \pm \Delta B}{V_B} \quad (2)$$

In Equation (2), A represents the initial write volume of the memory unit 70-0, ΔA represents the compensation data volume of the memory unit 70-0, $V_A$ represents the data writing speed of the memory unit 70-0, B represents the initial write volume of the memory unit 70-1, ΔB represents the compensation data volume of the memory unit 70-1, $V_B$ represents the data writing speed of the memory unit 70-1.

It is possible to obtain ΔA and ΔB through calculating Equation (2). In this exemplary embodiment, it is assumed that A is a data volume of two units of write, and B is a data volume of one unit of write. If the detected $V_A$ is two times $V_B$, the memory management circuit 502 may substitute A, B, $V_A$, and $V_B$ into Equation (2) to obtain ΔA, which is, for example, a data volume of two units of write, and ΔB, which is, for example, zero. Here, according to the write sequence, the memory management circuit 502 may transfer the sum of the first initial write volume and a first compensation data volume corresponding to the memory unit 70-0, that is, data of four units of write (also referred to as a first data) in the write data to the memory unit 70-0 through the data input/output bus 72-0, and then transfer a write data of one unit of write (i.e., the second initial write volume) to the memory unit 70-1 through the data input/output bus 72-1. Here, since ΔB is zero, the memory unit 70-1 has no corresponding compensation data volume. For example, assuming the unit of write is one physical unit, the memory management circuit 502 transfers data of four physical units to the memory unit 70-0 through the data input/output bus 72-0, and then transfers data of one physical unit to the memory unit 70-1 through the data input/output bus 72-1. With reference to FIG. 9, the memory unit 70-0 sequentially writes the received data to the physical units 700(0), 701(0), 700(1), 701(1), and the memory unit 70-1 sequentially writes the received data to the physical unit 702(0). After transferring the data of the above five physical units, the memory management circuit 502 again sequentially transfers data of four physical units to the memory unit 70-0 through the data input/output bus 72-0, transfers data of one physical unit to the memory unit 70-1 through the data input/output bus 72-1, and so on and so forth. With reference to FIG. 9, the memory unit 70-0 sequentially writes the received data to the physical units 700(2), 701(2), 700(3), 701(3), and the memory unit 70-1 sequentially writes the received data to the physical unit 702(1).

It should be noted that according to different write sequences, the memory management circuit 502 may also first transfer a write data of one unit of write to the memory unit 70-1 through the data input/output bus 72-1, and then transfer a write data of four units of write to the memory unit 70-0 through the data input/output bus 72-0, which is not limited by the disclosure.

In an exemplary embodiment, the memory management circuit 502 determines a category of data to be written into the memory unit according to the number of dies of the memory unit. For example, the memory management circuit 502 may store a logical-to-physical address mapping table that needs to be accessed frequently into a memory unit with a relatively great number of dies. With reference to FIG. 7, the memory management circuit 502 may store the logical-to-physical address mapping table into the memory unit 70-0.

In an exemplary embodiment, the memory management circuit 502 determines a priority for performing a garbage collection operation on the memory unit according to the number of dies of the memory unit. For example, the memory management circuit 502 may prioritize performing a garbage collection operation on a memory unit with a relatively great number of dies. With reference to FIG. 7, the memory management circuit 502 may prioritize performing a garbage collection operation on the memory unit 70-0.

Figure 10:
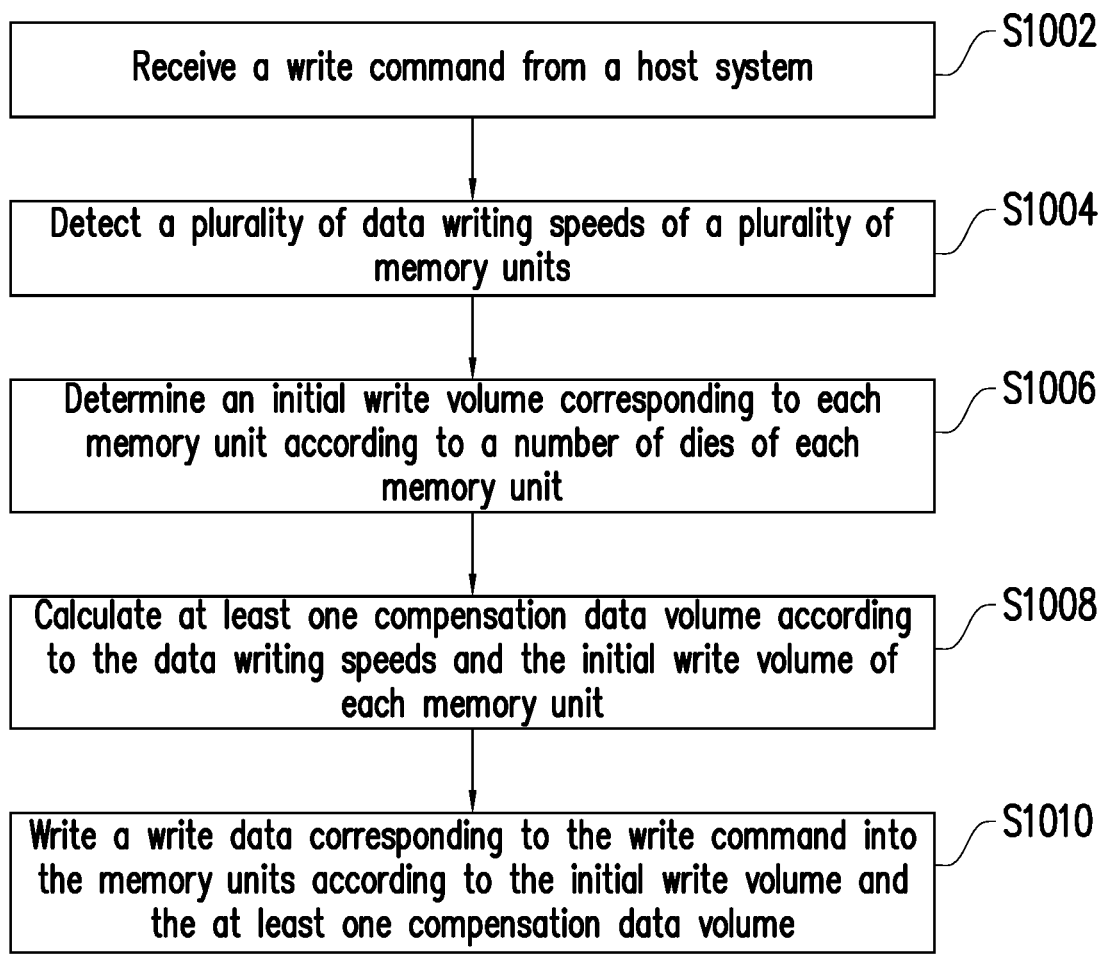
FIG. 10 is a flowchart of a data storing allocation method according to an exemplary embodiment of the disclosure.

FIG. 10 is a flowchart of a data storing allocation method according to an exemplary embodiment of the disclosure. In step S1002, a write command is received from a host system. In step S1004, a plurality of data writing speeds of a plurality of memory units are detected. In step S1006, an initial write volume corresponding to each memory unit is determined according to a number of dies of each memory unit. In step S1008, at least one compensation data volume is calculated according to the data writing speeds and the initial write volume of each memory unit. In step S1010, a write data corresponding to the write command is written into the memory units according to the initial write volume and the at least one compensation data volume.

However, each step in FIG. 10 has been described in detail as above, and will not be repeatedly described herein. It is worth noting that each step in FIG. 10 may be implemented as multiple programming codes or circuits, which is not limited by the disclosure. In addition, the method of FIG. 10 may be used in conjunction with the above exemplary embodiments or may be used alone, which is not limited by the disclosure.

In summary of the foregoing, in the data storing allocation method, the memory storage apparatus, and the memory control circuit unit provided in the exemplary embodiments of the disclosure, the compensation data volumes can be determined according to the data writing speeds and the numbers of dies of the memory units, and data corresponding to the compensation data volumes can be additionally transferred to the memory units. By transferring a relatively great volume of data to a memory unit with a relatively fast data writing speed, the memory dies in each memory unit can be in a busy state at the same time. Accordingly, the volume of write data of each memory unit can be balanced in real time, thus improving data write efficiency of the memory storage apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data storing allocation method, adapted for a memory storage apparatus, wherein the memory storage apparatus has a memory control circuit unit and a rewritable non-volatile memory module, the rewritable non-volatile memory module comprises a plurality of memory units, and the data storing allocation method comprises:
   receiving a write command from a host system;
   detecting a plurality of data writing speeds of the memory units, wherein each of the memory units has a number of dies of memory dies, and is coupled to the memory control circuit unit through one of a plurality of data input/output buses;
   determining an initial write volume of each of the memory units according to the number of dies of each of the memory units;
   calculating at least one compensation data volume according to the data writing speeds and the initial write volume of each of the memory units; and
   writing a write data corresponding to the write command into the memory units according to the initial write volume of each of the memory units and the at least one compensation data volume.

2. The data storing allocation method according to claim 1, wherein determining the initial write volume of each of the memory units according to the number of dies of each of the memory units comprises:
   determining a write ratio between the memory units according to the number of dies of each of the memory units; and
   calculating the initial write volume of each of the memory units according to the write ratio and a unit of write.

3. The data storing allocation method according to claim 1, wherein values obtained from dividing a sum of the initial write volume of each of the memory units and the compensation data volume corresponding to each of the memory units by the data writing speed of each of the memory units are the same.

4. The data storing allocation method according to claim 1, wherein writing the write data corresponding to the write command into the memory units according to the initial write volume of each of the memory units and the at least one compensation data volume comprises:
   transferring a first data corresponding to a sum of a first initial write volume of a first memory unit in the memory units and a first compensation data volume in the write data to the first memory unit through a first data input/output bus coupled to the first memory unit.

5. The data storing allocation method according to claim 1, wherein the method further comprises:
   detecting a first data writing speed of a first memory unit and a second data writing speed of a second memory unit in the memory units, wherein a first number of dies of the memory dies in the first memory unit is greater than a second number of dies of the memory dies in the second memory unit;
   determining a first initial write volume of the first memory unit according to the first number of dies, and determining a second initial write volume of the second memory unit according to the second number of dies;
   calculating the at least one compensation data volume according to the first data writing speed, the second data writing speed, the first initial write volume, and the second initial write volume; and
   transferring the write data to the first memory unit according to the first initial write volume and the at least one compensation data volume.

6. The data storing allocation method according to claim 5, wherein the method further comprises:
   after transferring the write data to the first memory unit according to the first initial write volume and the at least one compensation data volume, transferring the write data to the second memory unit according to the second initial write volume.

7. The data storing allocation method according to claim 1, wherein the rewritable non-volatile memory module is a quad level cell (QLC) NAND-type flash memory module, and the number of dies of at least one of the memory units is different from the number of dies of other ones of the memory units.

8. The data storing allocation method according to claim 1, wherein the method further comprises:
   determining a category of data to be written into each of the memory units or a priority for performing a garbage collection operation on each of the memory units according to the number of dies of each of the memory units.

9. A memory storage apparatus, comprising:
   a connection interface unit, configured to be coupled to a host system;

a rewritable non-volatile memory module, comprising a plurality of memory units; and a memory control circuit unit, coupled to the connection interface unit and the rewritable non-volatile memory module, wherein the memory control circuit unit is configured to receive a write command from the host system, the memory control circuit unit is further configured to detect a plurality of data writing speeds of the memory units, wherein each of the memory units has a number of dies of memory dies, and is coupled to the memory control circuit unit through one of a plurality of data input/output buses, the memory control circuit unit is further configured to determine an initial write volume of each of the memory units according to the number of dies of each of the memory units, the memory control circuit unit is further configured to calculate at least one compensation data volume according to the data writing speeds and the initial write volume of each of the memory units, and the memory control circuit unit is further configured to write a write data corresponding to the write command into the memory units according to the initial write volume of each of the memory units and the at least one compensation data volume.

10. The memory storage apparatus according to claim 9, wherein the memory control circuit unit is further configured to determine a write ratio between the memory units according to the number of dies of each of the memory units, and the memory control circuit unit is further configured to calculate the initial write volume of each of the memory units according to the write ratio and a unit of write.

11. The memory storage apparatus according to claim 9, wherein values obtained from dividing a sum of the initial write volume of each of the memory units and the compensation data volume corresponding to each of the memory units by the data writing speed of each of the memory units are the same.

12. The memory storage apparatus according to claim 9, wherein the memory control circuit unit is further configured to transfer a first data corresponding to a sum of a first initial write volume of a first memory unit in the memory units and a first compensation data volume in the write data to the first memory unit through a first data input/output bus coupled to the first memory unit.

13. The memory storage apparatus according to claim 9, wherein the memory control circuit unit is further configured to detect a first data writing speed of a first memory unit and a second data writing speed of a second memory unit in the memory units, wherein a first number of dies of the memory dies in the first memory unit is greater than a second number of dies of the memory dies in the second memory unit, the memory control circuit unit is further configured to determine a first initial write volume of the first memory unit according to the first number of dies, and to determine a second initial write volume of the second memory unit according to the second number of dies, the memory control circuit unit is further configured to calculate the at least one compensation data volume according to the first data writing speed, the second data writing speed, the first initial write volume, and the second initial write volume, and the memory control circuit unit is further configured to transfer the write data to the first memory unit according to the first initial write volume and the at least one compensation data volume.

14. The memory storage apparatus according to claim 13, wherein after transferring the write data to the first memory unit according to the first initial write volume and the at least one compensation data volume, the memory control circuit unit is further configured to transfer the write data to the second memory unit according to the second initial write volume.

15. The memory storage apparatus according to claim 9, wherein the rewritable non-volatile memory module is a quad level cell (QLC) NAND-type flash memory module, and the number of dies of at least one of the memory units is different from the number of dies of other ones of the memory units.

16. The memory storage apparatus according to claim 9, wherein the memory control circuit unit is further configured to determine a category of data to be written into each of the memory units or a priority for performing a garbage collection operation on each of the memory units according to the number of dies of each of the memory units.

17. A memory control circuit unit, configured to control a rewritable non-volatile memory module, wherein the rewritable non-volatile memory module comprises a plurality of memory units, and the memory control circuit unit comprises:

a host interface, configured to be coupled to a host system;

a memory interface, configured to be coupled to the rewritable non-volatile memory module; and a memory management circuit, coupled to the host interface and the memory interface, wherein the memory management circuit is configured to receive a write command from the host system, the memory management circuit is further configured to detect a plurality of data writing speeds of the memory units, wherein each of the memory units has a number of dies of memory dies, and is coupled to the memory control circuit unit through one of a plurality of data input/output buses, the memory management circuit is further configured to determine an initial write volume of each of the memory units according to the number of dies of each of the memory units, the memory management circuit is further configured to calculate at least one compensation data volume according to the data writing speeds and the initial write volume of each of the memory units, and the memory management circuit is further configured to write a write data corresponding to the write command into the memory units according to the initial write volume of each of the memory units and the at least one compensation data volume.

18. The memory control circuit unit according to claim 17, wherein the memory management circuit is further configured to determine a write ratio between the memory units according to the number of dies of each of the memory units, and the memory management circuit is further configured to calculate the initial write volume of each of the memory units according to the write ratio and a unit of write.

19. The memory control circuit unit according to claim 17, wherein values obtained from dividing a sum of the initial write volume of each of the memory units and the compensation data volume corresponding to each of the memory units by the data writing speed of each of the memory units are the same.

20. The memory control circuit unit according to claim 17, wherein the memory management circuit is further configured to transfer a first data corresponding to a sum of a first initial write volume of a first memory unit in the memory units and a first compensation data volume in the write data to the first memory unit through a first data input/output bus coupled to the first memory unit.

21. The memory control circuit unit according to claim 17, wherein the memory management circuit is further configured to detect a first data writing speed of a first memory unit and a second data writing speed of a second memory unit in the memory units, wherein a first number of dies of the memory dies in the first memory unit is greater than a second number of dies of the memory dies in the second memory unit, the memory management circuit is further configured to determine a first initial write volume of the first memory unit according to the first number of dies, and to determine a second initial write volume of the second memory unit according to the second number of dies, the memory management circuit is further configured to calculate the at least one compensation data volume according to the first data writing speed, the second data writing speed, the first initial write volume, and the second initial write volume, and the memory management circuit is further configured to transfer the write data to the first memory unit according to the first initial write volume and the at least one compensation data volume.

22. The memory control circuit unit according to claim 21, wherein after transferring the write data to the first memory unit according to the first initial write volume and the at least one compensation data volume, the memory management circuit is further configured to transfer the write data to the second memory unit according to the second initial write volume.

23. The memory control circuit unit according to claim 17, wherein the rewritable non-volatile memory module is a quad level cell (QLC) NAND-type flash memory module, and the number of dies of at least one of the memory units is different from the number of dies of other ones of the memory units.

24. The memory control circuit unit according to claim 17, wherein the memory management circuit is further configured to determine a category of data to be written into each of the memory units or a priority for performing a garbage collection operation on each of the memory units according to the number of dies of each of the memory units.

* * * * *